Patented May 2, 1933

1,906,581

UNITED STATES PATENT OFFICE

IVAN GUBELMANN, HENRY J. WEILAND, AND OTTO STALLMANN, OF SOUTH MILWAUKEE, WISCONSIN, ASSIGNORS, BY MESNE ASSIGNMENTS, TO E. I. DU PONT DE NEMOURS & COMPANY, A CORPORATION OF DELAWARE

ANTHRAQUINONE DERIVATIVES AND A PROCESS OF PREPARING THE SAME

No Drawing. Application filed January 2, 1929. Serial No. 329,947.

This invention relates to 1-amino- and 1-acetyl-amino-2-substituted-4-halogen-9-anthrones and to a method of preparing these bodies.

It is an object of this invention to provide a method whereby these products are made technically available, as they are valuable intermediate compounds for use in the preparation of dyestuffs.

Other and further important objects of this invention will become apparent from the following description and appended claims.

The bodies to which our invention relates are of the following general constitution:

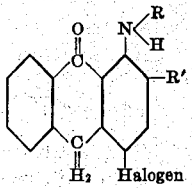

in which R is a hydrogen atom or acidyl group, such as acetyl. R' is a univalent group such as a halogen atom, a methyl, methoxy, ethoxy group, or the like. The halogen in the 4 position may be either chlorine or bromine.

We have discovered that the 3'-amino and the acetyl-N-substituted 3'-amino-4'-substituted-6'-halogen benzyl ortho benzoic acids, which are the subject of a copending application executed and filed of even date herewith Serial No. 329,946, may be condensed by means of suitable condensing agents to the 1-amino and the acetyl N-substituted 1-amino-2-substituted-4-halogen-9-anthrones. On account of the structure of the starting material, the structure of the anthrone resulting from our method is definitely determined, since dehydration or condensation can take place to form an anthrone only on the hydrogen in the 2' position of the amino benzyl ortho benzoic acid. This structure also fixes definitely the position of the amino group on the anthrone and the position of the ketone group with respect to the substituents on the anthraquinone ring. This fixing of the position of the ketone group has not been certain on the anthrones when prepared by reducing the unsymmetrical anthraquinone bodies to the anthrones, nor has the separation of the isomeric bodies possible from such reaction been described to our knowledge.

The hydrogen on the amino group may be substituted by other groups, as for example, acidyl groups like acetyl. We find that the condensation of the compounds in which the amino group is protected, as by an acidyl substituent, runs smoother and more efficiently. In general, the acidyl group on the amino group remains after condensation and can be removed, if desired, by known methods of hydrolyzing acidyl amido bodies.

The condensing agents employed may be any of the generally known ones for effecting ring closure, as for example, concentrated sulfuric acid, phosphorous pentoxide in a solvent like acetic acid, or phosphorus pentachloride in a solvent like toluene. In the last mentioned case, the reaction probably goes to form the acid chloride, which later condenses, eliminating hydrochloric acid. In the use of concentrated sulfuric acid, or of sulfuric acid monohydrate, the stronger the acid, the lower the temperature required, and, other conditions being the same, the shorter the duration of the dehydrating reaction. For specific compounds, one method of condensation may possess advantages over the others and this can be determined by trial.

This invention contemplates the condensation of all 3'-amino, and 3'-acetyl-amino benzyl ortho benzoic acids which are substituted in the 6' position by a halogen and which may be substituted in the 4'-position by halogen or other univalent groups such as above described. Among those which we deem the most important at this time are the following, but we do not wish to be limited to these examples since the invention in its broadest aspect covers the condensation of 3'-amino-benzyl ortho benzoic acids of this general constitution. Definite anthrones are formed with respect to the relative position of the "keto" group and the substituents on the ring.

1-amino-2-methyl-4-chloro-9-anthrone
1-amino-2-methyl-4-bromo-9-anthrone
1-amino-2-methoxy-4-chloro-9-anthrone
1-amino-2-methoxy-4-bromo-9-anthrone
1-amino-2-ethoxy-4-chloro-9-anthrone
1-amino-2-ethoxy-4-bromo-9-anthrone
1-amino-2-halogen-4-bromo-9-anthrone
1-amino-2-halogen-4-chloro-9-anthrone In the above list the amino group may be substituted by acidyl groups, such as acetyl. It is obvious that the 2-position can be occupied by other groups as for example, carboxy, sulfonic acid and the like.

The following examples are given to illustrate the preferred embodiments of our process for preparing these compounds. The proportions given are in parts by weight.

*Example I*

10 parts of 3'-amino-4'-methoxy-6'-chloro benzyl ortho benzoic acid (melting point 185–188° C.) are added to 75 parts of glacial acetic acid and 25 parts of acetic anhydride. The mass is heated to reflux temperature for a short time and then cooled to 50° C. At this temperature 10 parts of phosphorus pentoxide are added. The mass is again heated to reflux temperature for a few minutes and then cooled to 60° C. About 200 parts of water are now added, or a quantity of water sufficient to begin crystallization of the anthrone. The mass is cooled to room temperature and filtered. The filter cake is washed with a small amount of hot water. Upon recrystallizing from acetic acid the product, 1-acetyl-amino-2-methoxy-4-chloro-9-anthrone melts at 170° C. (with decomposition). It can be hydrolyzed to the amino body by known methods of hydrolyzing similar bodies. By oxidizing the acetyl body, the 1-acetylamino-2-methoxy-4-chloro anthraquinone of melting point 242–243° C. is formed, which upon hydrolysis gives 1-amino-2-methoxy-4-chloro anthraquinone, melting point 217–218° C.

*Example II*

10 parts of 3'-amino-4'-methoxy-6'-bromo-benzyl ortho-benzoic acid are treated as in Example I. The product obtained is 1-acetyl-amino-2-methoxy-4-bromo-9-anthrone, which melts at 153–154° C. This product can be hydrolyzed to the free base in a similar manner as in Example I. By oxidizing the acetyl body, 1-acetylamino-2-methoxy-4-bromo-anthraquinone is formed, melting point 205–206° C. This body upon hydrolysis gives 1-amino-2-methoxy-4-bromo anthraquinone, melting point 198.0° C.

*Example III*

30 parts of 3'-amino-4'-methyl-6'-bromo-benzyl-ortho-benzoic acid are added to 125 parts of acetic acid and 25 parts of acetic anhydride. The mixture is heated to reflux for a few minutes, cooled to 90–100° C. and 20 parts of phosphorus pentoxide added. It is then heated again to the point of reflux for a few minutes, cooled to 90° C. and water, about 150 parts, added until the reaction product starts to crystallize out. The mass is cooled to room temperature and filtered. After recrystallizing from glacial acetic acid, the product, 1-acetyl-amino-2-methyl-4-bromo-9-anthrone melts at 171° C. (decomposition). This body can be hydrolyzed to the free base by methods adapted for the hydrolysis of similar bodies. By oxidizing the acetyl body there is obtained 1-acetyl-amino-2-methyl-4-bromo-anthraquinone of melting point 212–213° C. This body upon hydrolysis gives 1-amino-2-methyl-4-bromo-anthraquinone which melts at 228° C.

*Example IV*

30 parts of 3'-amino-4'-methyl-6'-chloro-benzyl-ortho-benzoic acid are treated as in Example III. The product obtained is 1-acetylamino-2-methyl-4-chloro-9-anthrone having a melting point of 175° C. By oxidizing the acetyl derivatives there is formed the 1-acetylamino-2-methyl-4-chloro-anthraquinone which melts at 203–204° C. This body upon hydrolysis gives 1-amino-2-methyl-4-chloro-anthraquinone, which melts at 265–266° C.

*Example V*

10 parts of 3'-acetylamino-4'-methoxy-6'-chloro benzyl benzoic acid are dissolved in 50 parts of sulfuric acid monohydrate and heated to 50–60° C. for a short time. The mass is then poured into 500 parts of cold water and ice, whereby the product separates and after recrystallization is identical with that obtained in Example I.

*Example VI*

30 parts of 3'-amino-4'-6'-dichloro benzyl ortho benzoic acid are added to 125 parts of glacial acetic acid and 25 parts of acetic anhydride. The mixture is heated to reflux for a few minutes. It is then cooled to 90° C. and 20 parts of phosphorus pentoxide added. The mixture is again heated to reflux for a few minutes and cooled to about 90° C. Water is now added, about 150 parts, or until the product starts to crystallize out. The mass is cooled to room temperature and filtered. The product, 1-acetyl-amino-2,4-dichloro-9-anthrone, is washed with water and diluted sodium carbonate solution. Upon recrystallizing from acetic acid the melting point is 208° C. This product can be hydrolyzed to the base by boiling for a short time in 10% sulfuric acid.

It is obvious that instead of starting with the halogenated benzyl ortho benzoic acids, that the benzyl ortho benzoic acids can be halogenated under anhydrous conditions and then without isolating them, the condensation can be continued to the anthrone. These compounds (acetyl) are in general bright yellow colored bodies in the pure state. They are quite soluble in hot glacial acetic acid, toluene and nitro benzene, but less so in the cold. From the above solvents they may be recrystallized in the form of small yellow needles. They are practically insoluble in cold dilute soda ash and very slightly soluble in caustic solution, but are easily soluble in alcoholic caustic soda with a strong yellow fluorescence. They are soluble in cold concentrated sulfuric acid, imparting thereto a deep red color. When heated with sulfuric acid above 70–80° C., stronger coloration takes place with a liberation of sulfur dioxide changing to highly colored anthraquinone bodies which dye acetyl cellulose silk. These N-substituted anthrones may be oxidized to the corresponding anthraquinone bodies which may be later hydrolyzed to the 1-amino-2-substituted-4-halogen anthraquinones.

When the acetyl derivatives are heated with about 10% sulfuric acid, the free bases are obtained which are yellow colored bodies quite similar in properties to the acetyl bodies except that they are soluble in hot diluted mineral acids. Upon cooling down a dilute sulfuric acid solution of the above the sulfates of the anthrones precipitate out. By large dilution with water the sulfates are hydrolyzed to the free bases.

The anthrones containing acid groups in the 2 position, as for example, carboxy and sulfonic acids, have somewhat different solubility properties due to the acidic nature of the groups.

We are aware that numerous details of the process may be varied through a wide range without departing from the principles of this invention, and we, therefore, do not purpose limiting the patent granted hereon otherwise than necessitated by the prior art.

We claim as our invention:

1. The process of preparing 1-amino-4-halogen-9-anthrone bodies of the group including free amino and acidyl-amino bodies substituted in the 2 position by a member of the group consisting of halogen, alkyl, alkoxy, carboxy and sulfonic acid groups which comprises reacting with dehydrating agents corresponding 3' - amino - 6' - halogen - benzyl-ortho-benzoic acids selected from a group comprising the free amino and acidyl-amino bodies which are substituted in the 4' position by a member of the group consisting of halogen, alkyl, alkoxy, carboxy, and sulfonic acid groups.

2. The process of preparing 1-amino-4-halogen-9-anthrones substituted in the 2 position by a member of the group consisting of halogen, alkyl, alkoxy, carboxy and sulfonic acid groups, which comprises the step of reacting with dehydrating agents corresponding 3'-acetyl-amino-4'-substituted-6'-halogen-benzyl-ortho-benzoic acids.

3. The process of preparing an anthrone of the group comprising 1-amino-4-halogen-9-anthrones and 1-acetyl-amino-4-halogen-9-anthrones substituted in the 2 position by a member of the group consisting of halogen, alkyl, alkoxy, carboxy and sulfonic acid groups which comprises condensing with phosphorus pentoxide in acetic acid a compound selected from the group comprising 3'-amino-6'-halogen-benzyl-ortho-benzoic acids and 3'-acetyl-amino-6'-halogen-benzyl-ortho-benzoic acids substituted in the 4' position by a member of the group consisting of halogen, alkyl, alkoxy, carboxy, and sulfonic acid groups.

4. The process of preparing 1-amino-4-halogen-9-anthrones substituted in the 2 position by a member of the group consisting of halogen, alkyl, alkoxy, carboxy and sulfonic acid groups which comprises condensing 3'-acetyl-amino-6'-halogen-benzyl-ortho-benzoic acids substituted in the 4' position with a member of the group consisting of halogen, alkyl, alkoxy, carboxy and sulfonic acid groups with phosphorus pentoxide in acetic acid to form the corresponding 1-acetyl-amino-2-substituted-4-halogen-9-anthrones and hydrolyzing said acetyl-amino-anthrone to the free base.

5. As new articles of manufacture, amino anthrones of the general formula

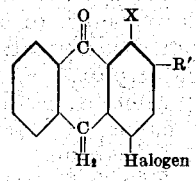

wherein X stands for an amino or an acidyl-amino group; R' stands for a member of the group consisting of halogen, alkyl, alkoxy, carboxy and sulfonic acid groups and "halogen" is a chlorine or bromine atom.

6. As new articles of manufacture, amino anthrones of the general formula

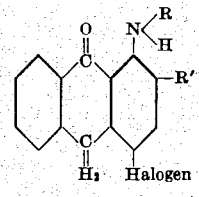

in which R is a hydrogen atom or an acetyl group; R' is a member of the group consisting of halogen, alkyl, alkoxy, carboxy and sulfonic acid groups and "halogen" is a chlorine or bromine atom.

7. The process of preparing 1-amino-4-halogen-9-anthrones substituted in the 2 position by a member of the group consisting of halogen, alkyl, alkoxy, carboxy and sulfonic acid groups which comprises heating corresponding 3'-acetyl-amino-6'-halogen-benzyl-ortho-benzoic acids substituted in the 4' position with a member of the group consisting of halogen, alkyl, alkoxy, carboxy and sulfonic acid groups with phosphoric acid in acetic acid at the reflux temperature of the mixture, diluting the mixture to precipitate the anthrones and filtering the precipitate.

8. The process of preparing 1-amino-4-chloro-9-anthrones substituted in the 2 position with a member of the group consisting of halogen, alkyl, alkoxy, carboxy and sulfonic acid groups which comprises treating 3'-acetyl-amino-6'-chloro-benzyl-ortho-benzoic acids substituted in the 4' position with a member of the group consisting of halogen, alkyl, alkoxy, carboxy and sulfonic acid groups with phosphorus pentoxide in acetic acid at the reflux temperature of the mixture, cooling the solution, diluting the solution to cause precipitation of the anthrones and filtering the anthrones.

9. As new articles of manufacture, compounds of the general formula

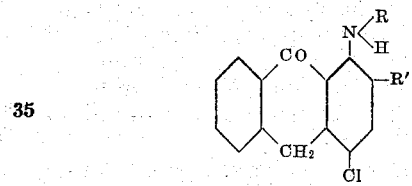

wherein R is a hydrogen atom or an acetyl group and R' is a member of the group consisting of halogen, alkyl, alkoxy, carboxy and sulfonic acid groups.

In testimony whereof, we have hereunto subscribed our names at Carrollville, Milwaukee County, Wisconsin.

IVAN GUBELMANN.
HENRY J. WEILAND.
OTTO STALLMANN.